United States Patent [19]

Bogie

[11] 3,904,135

[45] Sept. 9, 1975

[54] SOLID WASTE CHIPPER

[76] Inventor: Nelson H. Bogie, Rt. 1, Sledd Creek Rd., Gilbertsville, Ky. 42044

[22] Filed: Nov. 9, 1973

[21] Appl. No.: 414,357

Related U.S. Application Data

[63] Continuation-in-part of Ser. No. 369,459, June 13, 1973, abandoned.

[52] U.S. Cl. .................. 241/86; 241/190; 241/194
[51] Int. Cl.² ................ B02C 13/09; B02C 13/26; B02C 13/282
[58] Field of Search .......... 241/86, 87.1, 89.2, 89.3, 241/185 R, 186 R, 190, 191, 194, 189 R

[56] References Cited
UNITED STATES PATENTS

| | | | |
|---|---|---|---|
| 2,286,545 | 6/1942 | Hochn | 241/86 X |
| 3,189,286 | 6/1965 | O'Connor | 241/189 R X |
| 3,486,704 | 12/1969 | Persky | 241/190 X |

Primary Examiner—Granville Y. Custer, Jr.
Assistant Examiner—E. F. Desmond
Attorney, Agent, or Firm—Harrington A. Lackey

[57] ABSTRACT

A solid waste chipper having a housing and a plurality of elongated chipper blades swingably mounted for rotary movement within the housing and through slots formed by pairs of spaced anvil bars. The spaced anvil bars are characterized by sloping, intersecting leading and trailing edges so that each chipper blade, moving in the direction of rotation between a pair of anvil bars, normally makes an acute angle with the leading edges to more effectively shear solid objects caught between the moving chipper blade and the stationary anvil bars.

The apparatus is further characterized by a plurality of pairs of anvil bars angularly spaced from each other to form radial ports therebetween to provide successive shearing stages between the chipper blades and the angularly spaced sets of anvil bars.

15 Claims, 8 Drawing Figures

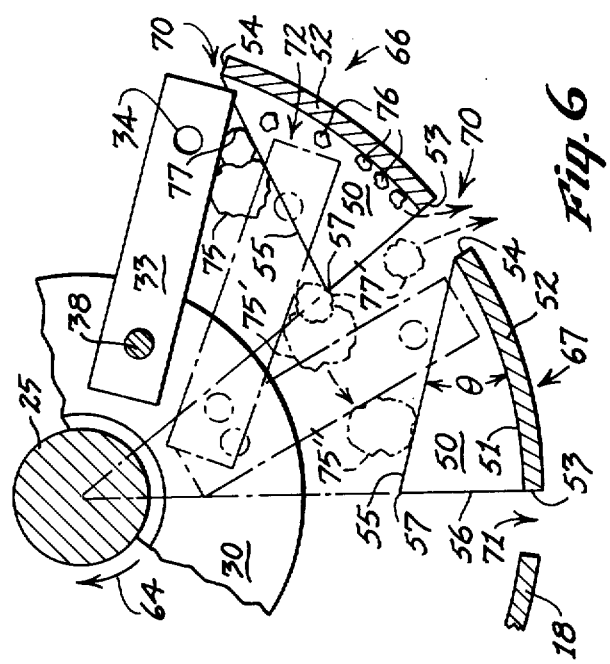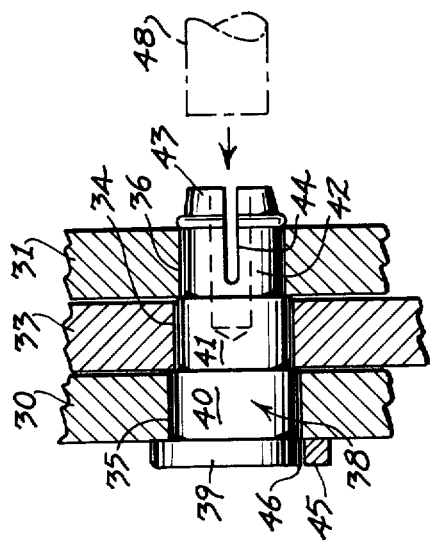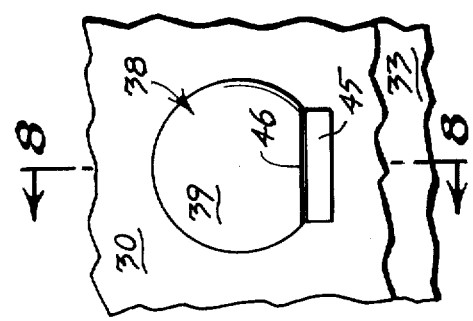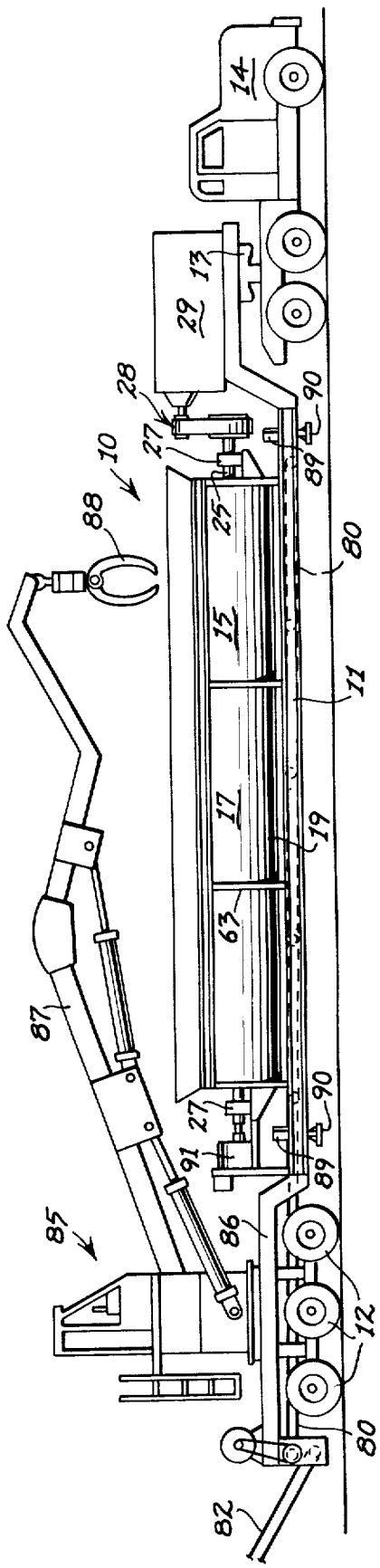

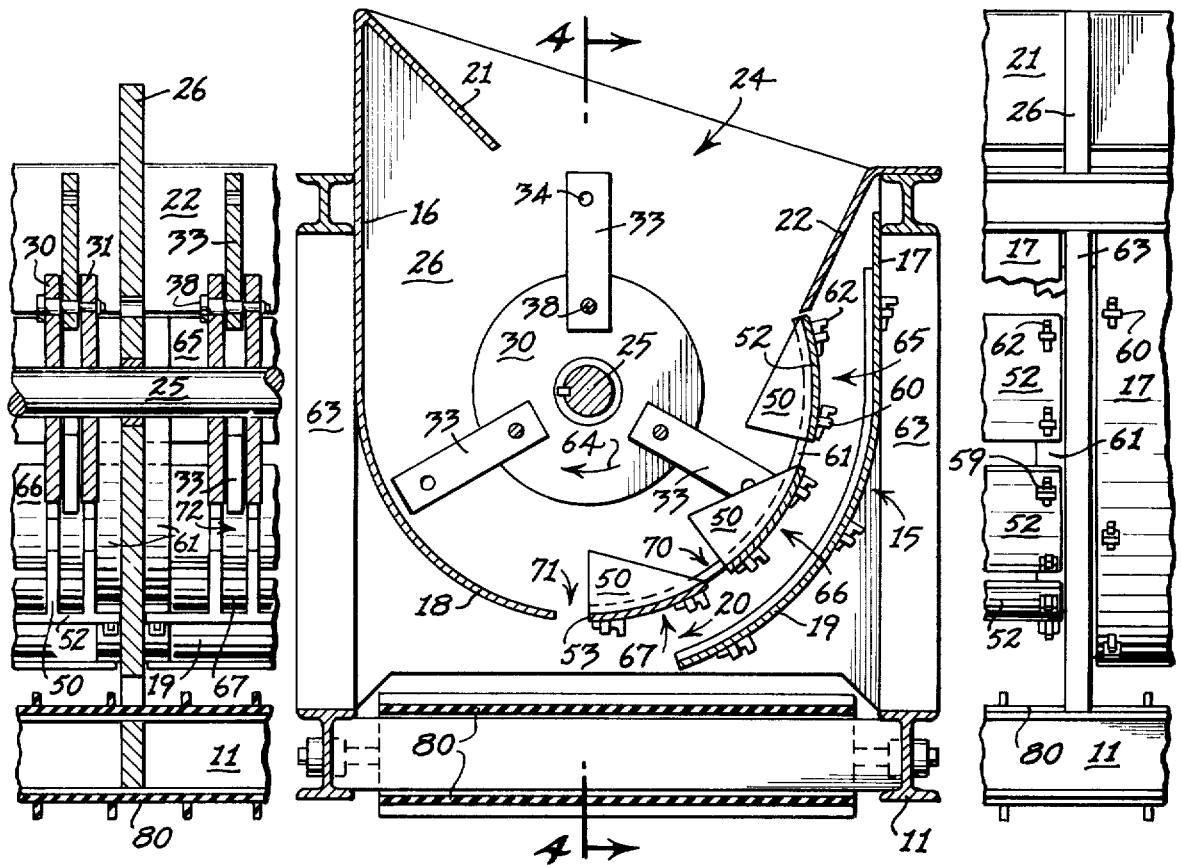
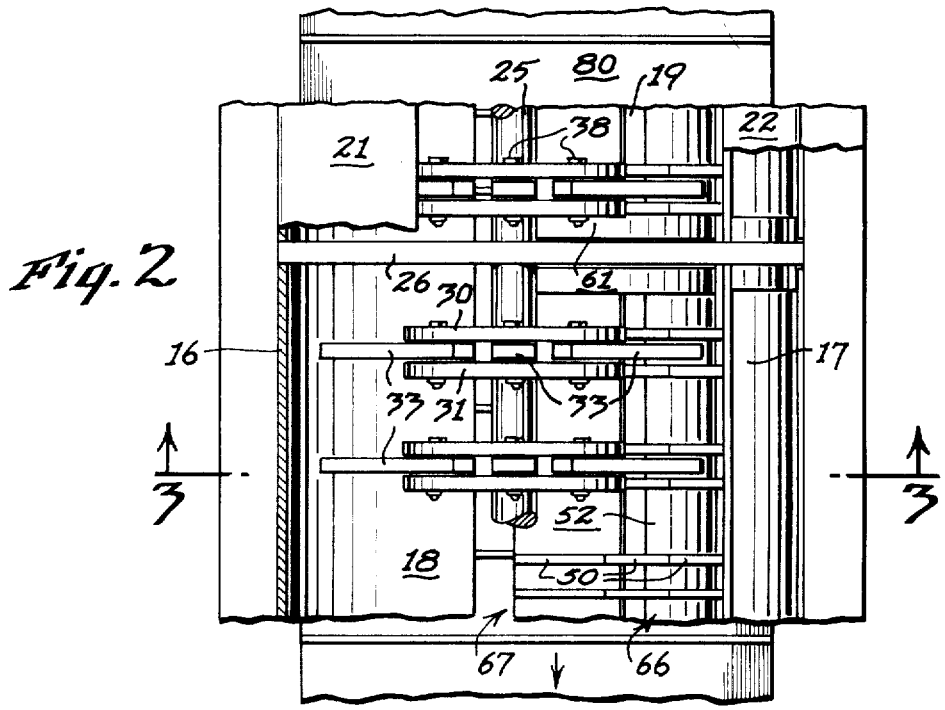
Fig. 4   Fig. 3   Fig. 5
Fig. 2

SOLID WASTE CHIPPER

CROSS-REFERENCE TO RELATED APPLICATION

This is a continuation-in-part of application Ser. No. 369,459, filed June 13, 1973, of Nelson H. Bogie for "SOLID WASTE CHIPPER," now abandoned.

BACKGROUND OF THE INVENTION

This invention relates to a solid waste chipper, and more particularly to a solid waste reduction apparatus having rotary chipper blades.

Solid waste reduction apparatus of the type having rotary blades co-acting with an anvil are known in the art. However, it is not believed that any solid waste reduction apparatus having rotary chipper blades co-acting with sloping anvil bars, much less angularly spaced sets of sloping anvil bars, is know in the art.

SUMMARY OF THE INVENTION

It is therefore an object of this invention to provide a solid waste chipper, or a solid waste reduction apparatus, having a casing, preferably with an upper inlet and a lower outlet, for receiving large solid waste objects and discharging the solid waste in smaller particle form.

The soild waste chipper made in accordance with this invention includes a horizontal rotary shaft supporting a plurality of longitudinally spaced discs, to which are pivotally or swingably mounted a plurality of elongated, generally radially disposed and freely swingable chipper blades. A plurality of angularly spaced sets of axially spaced pairs of anvil bars are formed, preferably in the lower portion of the casing, so that the ports formed between the angularly spaced sets of anvil bars communicate with the bottom outlet.

Each anvil bar is preferably of a generally triangular shape having a long leading edge, sloping in the direction of rotation of the rotary shaft radially toward the rotary axis, so that an acute shearing angle is formed between the leading edge of each chipper blade passing between an opposed pair of anvil bars.

The angularly spaced sets of anvil bars provide sequential stages for repetitious chipping, or reduction, of solid waste objects by the rotating chipper blades, if necessary.

The chipper blades are also especially mounted by particularly shaped pin holes and pins so that they may be easily detached from their supports on the rotary shaft for repair or replacement.

The anvil bars are especially mounted in the housing to facilitate rapid insertion, removal, sharpening and replacement.

The apparatus is also preferably carried upon a mobile frame for supporting, not only the housing for the chipper blades and anvils, but also the driving means and other accessory apparatus.

BRIEF DESCRIPTION OF THE DRAWINGS

FIG. 1 is a side elevation of the apparatus made in accordance with this invention mounted on a mobille frame, including loading and unloading apparatus;

FIG. 2 is an enlarged fragmentary top plan view of the chipper apparatus disclosed in FIG. 1;

FIG. 3 is a section taken along the line 3—3 of FIG. 2;

FIG. 4 is a fragmentary section taken along the line 4—4 of FIG. 3;

FIG. 5 is a fragmentary side elevation, with parts broken away, disclosing the right side of the housing in FIG. 3;

FIG. 6 is an enlarged fragmentary schematic elevation, illustrating the cooperation between the chipper blades and the anvil bars;

FIG. 7 is a fragmentary, enlarged, face view of one of the pins pivotally supporting a chipper blade; and FIG. 8 is a section taken along the line 8—8 of FIG. 7.

DESCRIPTION OF THE PREFERRED EMBODIMENT

Referring now to the drawings in more detail, FIG. 1 discloses a solid waste chipping or reducing apparatus 10 mounted upon an elongated mobile frame 11, supported at its rear end by wheels 12, and at its front end by a fifth wheel mechanism 13 upon a tractor vehicle 14.

Mounted on the mobile frame 11 is an elongated chipper housing 15 having upright side wall portions 16 and 17 (FIG. 3) and offset bottom wall segments or portions 18 and 19 defining a bottom opening or outlet 20.

Declining inwardly from the top edges of the side wall portions 16 and 17 are a pair of top wall portions 21 and 22 defining a top opening or inlet 24, through which solid waste objects, adapted to be chipped or reduced, are introduced into the housing 15.

Extending longitudinally the length of the housing 15 is a rotary shaft 25, the opposite ends of which extend through openings in the end walls and intermediate partition walls 26 of the housing, and are journalled for rotary movement in bearings 27. The rotary shaft 25 is driven at its front end in FIG. 1 through a cog-belt transmission 28 by motor 29.

Fixed to the rotary shaft 25 are a plurality of axially spaced pairs of mounting discs 30 and 31. The discs 30 and 31 in each pair are, in turn, spaced apart from each other just sufficiently to freely receive an elongated, substantially rectangular, chipper blade 33. The spacing between each disc 30 and 31 is slightly greater than the thickness of the chipper blade 33.

A pin hole 34 of uniform diameter is form ed through each end portion of each chipper blade 33. Each disc 30 is provided with one or more pin holes 35 of slightly greater diameter than each pin hole 34. The pin holes 35 are radially equidistant from the rotary axis of the shaft 25, and are also preferably uniformly, circumferentially spaced about the disc 30.

In a similar manner, one or more pin holes 36, of uniform diameters slightly less than the diameters of pin holes 34 in the chipper blades 33, are radially equidistant from the center of the disc 31, and uniformly, circumferentially spaced about the disc 31. Moreover, each pin hole 36 is in axial alignment with a corresponding pin hole 35 in the opposing disc 30. Also, all corresponding pin holes 35 and 36 in all the pairs of discs 30 and 31 are in axial alignment.

As best disclosed in FIGS. 7 and 8, a pin 38, having and enlarged head 39 at one end, has three graduated shank portions 40, 41 and 42, the diameters of which become gradually reduced in the axial direction away from the head 39. Moreover, the diameter of each successive shank portion 40, 41 and 42, is only slightly less than the corresponding pin holes 35, 34 and 36, respectively, for corresponding reception in the respective pin holes. Moreover, the large shank portion 40 has a larger diameter than the diameter of the pin hole 34 in the chipper blade 33, so that the shank portion 40 can only enter the pin hole 35 of the disc 30. In a similar manner, the intermediate shank portion 41 has a diameter greater than the pin hole 36, so that the shank portion 41 can only enter the pin holes 35 and 34, but will not enter the pin hole 36. The small shank portion 42 is adapted to slidably fit within the pin hole 36 and pass through the pin holes 35 and 34.

The end portion 43 of the pin 38, opposite from the head 39 is enlarged slightly and chamfered or tapered as shown in FIG. 8. The chamfered end portion 43 and small shank portion 42 are longitudinally split by a slot 44 to form a pair of flexible legs constituting each half of the end portion 43. Thus, the split, chamfered end portion 43, when inserted sequentially through the pin holes 35, 34 and 36, will pass freely through the holes 35 and 34 and be cammed through the pin hole 36 until it clears the pin hole 36 and snaps into an expanded locking position, as shown in FIG. 8.

A stop ledge 45 may be fixed on the exterior surface of the disc 30 to abut the flat relieved portion 46 of the head 39 in order to prevent rotation of the pin 38 while inserted through the pin holes 35, 34 and 36.

Assuming, as illustrated in the drawings, that each pair of discs 30 and 31 support three circumferentially, equally spaced chipper blades, hammer blades or cutter blades 33, for rotary swinging movement about the rotary shaft 25, the chipper blades 33 may be mounted at each respective position by inserting the chamfered end 43 of each pin 39 sequentially through the pin holes 35, 34 and 36, until the pin 38 is in the locked position of FIG. 8.

When it is desired to remove the pins 38, an elongated rod 48, only the end of which is fragmentarily shown in phantom in FIG. 8, may be inserted through a hole in the end wall toward which the chamfered end 43 of each pin 38 is pointing. There is a hole in each end wall and in each intermediate wall 26 aligned with all of the aligned pin holes extending the full length of the shaft 25. Accordingly, the rod 40 is pushed successively through the pin holes starting from the smallest pin hole 36 and gradually through the intermediate pin hole 34 and then the largest pin hole 35 for each set of discs 30 and 31, until all of the pins 38 are sequentially removed by a single long thrust of the rod 48. After all of the pins 38 are removed, the cutter blades or chipper blades 33 may be inspected, removed and discarded, replaced, or turned end-for-end, or rotated about the longitudinal axis of the blade to present a different cutting edge as the leading edge portion of the blade 33.

There is sufficient space between each blade 33 and its corresponding discs 30 and 31, and sufficient clearance between the pin hole 34 and the intermediate shank portion 41 of the pin 30, to permit each blade 33 to freely swing about the axis of the pin 38.

Moreover, each blade 33 is long enough that it extends almost to the inner face of the bottom wall segment 18, when the blade 33 is radially aligned with the shaft 35.

Mounted in the bottom portion of the housing 15 in arcuate alignment with the bottom wall segment 18 and spaced radially inward from the bottom wall segment 19 are a plurality of anvil bars 50. The anvil bars 50 are preferably of uniform size and generally triangular shape, with their base edges 51 integrally formed with an anvil base plate 52. Each base plate 52 preferably has an arcuate cross-section terminating in axially disposed, parallel side edges 53 and 54. More specifically, each base plate 52 is circular segment having a radius equal to the distance of the plate 52 from the rotary axis of the shaft 25.

The long leading edge 55 of each anvil bar 50 slopes in the direction of rotation of the shaft 25 and toward the shaft 25 at an angle $\theta$ with the tangent of the base edge 51 intersecting the leading edge 54. The trailing edge 56 of each anvil bar 50 is preferably substantially coextensive with the radius of the arcuate base edge 51, and merges with the leading edge 55 at the intersecting point or portion 57.

As best disclosed in FIG. 5, each end of each anvil base plate 52 is provided with a pair of apertures 59 extending therethrough. These apertures 59 are adapted to fit over mating or registering loops or hasp members 60 projecting radially from an arcuate runner 61. A runner 61 is mounted against the interior of each end wall and is also stationarily mounted upon any desired number of intermediate walls 26 supported by spaced frame structures 63 corresponding to the length of the anvil base plates 52 to be employed. Thus, pairs of runners 61 will be mounted at intervals spaced substantially the length of each anvil base plate 52 in order to support the opposite ends of the anvil base plates 52.

An anvil base plate 52 is installed upon a pair of runners 61 by registering the apertures 59 with corresponding hasp members 60 and forcing the apertures 59 over the hasp members until the end portions of each base plate 52 abut against the exterior surface of a runner 61. In this position, a wedge-shaped key or pin 62 is slipped through the loop or hasp member 60 to lock the anvil base plates 52 and the anvil bars 60 in place.

The anvil bars 50 are arranged in pairs upon their corresponding base plates 52, and spaced apart sufficiently to form a slot or interstice 72 sufficiently wide to permit the passage of the rapidly rotating chipper blades 33, as disclosed in FIGS. 2, 3 and 4. As disclosed in FIG. 3, the shaft 25 is rotated in the direction of the arrow 64, or clockwise, to cause each chipper blade 33 to move between a pair of anvil bars 50 in the direction from the small end of the anvil bar, along the radially inward sloping leading edges 55 and toward the trailing edges 56 between which each blade 33 makes its exit from the anvil bar slot 72.

Also as disclosed in the drawings, the anvil bars 50 are arranged in circumferentially spaced sets, such as the three sets 65, 66 and 67 illustrated in FIG. 3, so that each blade 33 passes sequentially between three successive pairs of anvil bars 50. Moreover, the spacing between the adjacent sets 65, 66 and 67 form openings or ports 70 between the adjacent edges 53 and 54. Also the base plate edge 53 of the last set 67 forms a port 71 with the bottom edge of the bottom wall segment 18.

As best disclosed in FIG. 6, the angle $\theta$ is preferably approximately 45°, and the leading edge 55 is preferably a straight edge. Thus, assuming no solid objects within the housing, each chipper blade 33 as it is rotated by the shaft 25 will assume a radial position. As the blade 33 moves in the rotational direction 64 between the corresponding pair of anvil bars 50, the blade 33 intersects the plane of the leading edges 55 at progressively increasing angles.

Because of the angular slope of the leading edges 55, the chipper blades 33 have a better "slicing action" or "angle of attach" upon a solid waste object 75 (FIG. 6), as the leading edge of each chipper blade 33 moves with forceful impact upon an object 75 resting against, or even sliding along, the corresponding leading edges 55.

If the initial stroke of a chipper blade 33 upon a solid object 75 reduces the solid object 75 by shearing, breaking or splitting off smaller particles, those particles having a smaller cross-sectional dimension than the width of the slot or interstice 72 will fall into the slot 72 between the corresponding anvil bars 50, or they will fall on the other side of one or the other of the anvil bars 50. In either case, the smaller particles will drop by gravity, either upon the surface of the base plate 52, particularly in the anvil sets 66 and 67, or directly through the next lowest port 70 or 71. The ports 70 and 71 are in communication with the bottom opening 20.

Mounted in the bottom portion of the mobile frame 11 is an unloading conveyor, such as the drag chain conveyor 80, to carry the discharged smaller particles 76 and 77 longitudinally toward the rear of the mobile frame 11, and upon discharge conveyor section 82 to a discharge station, such as a truck, not shown.

Intermediate objects 77, which are too large to pass through the interstices 72, are either carried in the direction of rotation along the leading edges 55 by a chipper blade 33 which has expended its energy, or is again hit with forceful impact by one or more subsequent blades 33 until reduced, or carried along the inclined ramp created by the leading edges 55.

The ports 70 and 71 are preferably of larger dimension than the slots or interstices 72, to permit intermediate sized objects 77 to pass by centrifugal force or gravity through such ports before being acted upon by the next set of anvil bars 50 and the next chipper blade 33. As disclosed in FIG. 6, an intermediate objece 77', which reaches the intersecting portions 57 of a pair of anvil bars 50, may drop by gravity through the port 70 or 71, or may be forced radially outwardly through the port 70 or 71 by centrifugal force. Of course, such intermediate objects 77' dropping from the first set 65 of anvil bars, by gravity, will fall upon the leading edges 55 of the next set of anvil bars 66, where the intermediate object 77' will be further struck by subsequennt chipper blades or carried by a blade 33 to the next port 70 where the object 77' will be discharged by gravity, as shown in FIG. 6.

A large object 75, not reduced on the anvil bars in sets 65 or 66, may be kicked across the port 70 between sets 66 and 67, as illustrated at 75' in FIG. 6, and land on the leading edges 55 for repeated comminuting action by subsequent chipper blades 33, as illustrated at position 75" in FIG. 6.

The chipper blades 33 not only co-act with the sharp leading edges 55 of the anvil bars 50, but also are driven with forceful impact upon the object 75 by the rapid rotation of the shaft 25. If an object 75 is too hard to be severed or crushed by a blade 33, the swinging pivotal connection of the blade 33 upon the discs 30 and 31, permits the blade 33 to yield, rather than fracture, and the blade 33 merely slides over the object 75.

As illustrated in FIG. 3, if an object, too large to be broken or to pass through the respective ports 70 or 71, is carried beyond the port 71 and up the sloping bottom wall segment 18 and side wall 16, by the continuously rotating chipper blades 33, these objects will be prevented from leaving the housing 15 by the inwardly declining top wall portion 21, which functions as a deflector. Any objects striking the deflector 21 will be forced back down into the bottom of the housing for repeated impact or shearing action by the chipper blades 33, or will be carried around through the upper portion of the housing by the chipper blades 33 so that the objects will be subjected to the same sequential action cycle over the anvil bar sets 65, 66 and 67.

If desired, a loading apparatus 85 may be supported upon the rear platform 86 of the mobile frame 11. A particular loading apparatus 85 is disclosed with a boom 87 and grapple 88. The apparatus 85 is operated to pick up large waste objects, such as logs, stumps, roots or other solid waste objects, and to deposit them into the housing 15 through the inlet 24.

The mobile platform 11 may be provided with hydraulic rams 89 for raising and lowering leveling feet 90 in order to support and stabilize the mobile frame 11 in a stationary position for a chipping, reduction or shredding operation. The rams 89, as well as other hydraulic equipment may be supplied with hydraulic fluid from a hydraulic pump 91 driven by an extension of the rotary shaft 25, if desired.

What is claimed is:
1. A solid waste chipper comprising:
   a. a housing having an inlet through which solid waste objects may be introduced for chipping, and an outlet through which chipped solid waste particles may exit,
   b. at least one elongated chipper blade having opposite end portions,
   c. means mounting said chipper blade for movement in a rotary path within said housing about a rotary axis,
   d. means for rotating said chipper blade in said rotary path,
   e. a first set of at least a pair of first anvil bars,
   f. a second set of at least a pair of second anvil bars angularly spaced from said first set of anvil bars circumferentially about said rotary axis,
   g. each of said anvil bars having a leading edge and a trailing edge merging at an intersecting portion,
   h. means mounting each set of anvil bars in said housing so that the anvil bars in each set are spaced apart on opposite sides of said rotary path to form first and second slots, respectively, through which said chipper blade moves,
   i. each of said first and second slots communicating with said outlet,
   j. each of said leading edges sloping from said corresponding intersection portion away from the rotary axis of said shaft, so that said chipper blade moves sequentially through said slots from said leading edges toward said trailing edges to normally engage a solid waste object on at least one of said leading edges at an acute shearing angle,
   k. the circumferential spacing between said first and second sets comprising a port of predetermined size slightly larger than the axial dimension of either of said slots, through which solid waste particles may pass,
   l. said port being in communication with said outlet.
2. The invention according to claim 1 further comprising means for pivotally connecting one end portion of each of said chipper blades to said mounting means about a swing axis parallel to said rotary axis for free swinging movement of said opposite end portion.

3. The invention according to claim 1 in which said trailing edges of said anvil bars in said first and second sets are disposed substantially radially of said rotary axis.

4. The invention according to claim 1 in which each leading edge is substantially straight and said elongated chipper blade is substantially straight, the angle of said leading edge and the length of said chipper blade being such that said chipper initially intersects said leading edge at an angle of approximately 45° as said chipper blade is rotated.

5. The invention according to claim 1 in which the rotary axis of said chipper blade is substantially horizontal, and said outlet is below said slots and said port.

6. The invention according to claim 5 in which said housing is elongated in the direction of said rotary axis, and has a top portion and a bottom portion, said inlet extending through said top portion, said outlet extending through said bottom portion, a plurality of longitudinally spaced chipper blades, longitudinally spaced pairs of said first and second anvil bars mounted in said housing so that the anvil bar slots of each first and second sets of anvil bars coincide with a rotary path of each of said chipper blades, an elongated baffle extending along the top portion of the housing adjacent said inlet and above the rotary path of the upwardly moving chipper blades to contain any upwardly directed solid objects within said housing.

7. The invention according to claim 1 in which the circumferential extent of said port occupies an arc substantially less than 90°.

8. The invention according to claim 1 in which each of said anvil bars is of uniform size and substantially triangular, including said leading edge, said trailing edge and a base edge portion, a base plate, said base edge portion being fixed on said base plate, and means for detachably securing said base plate within said housing.

9. The invention according to claim 8 in which said base plate has an arcuate cross-section and has opposite end portions, arcuate support members fixed in said housing and spaced apart longitudinally a distance slightly less than the length of said base plate, so that said opposite end portions engage flush against said arcuate support members, said detachable means detachably securing the opposite end portions of said base plate to said spaced arcuate support members.

10. The invention according to claim 9 in which said detachable securing means comprise one or more apertures in each end portion, a hasp member fixed to each of said support members and adapted to extend through a corresponding aperture, and a key member adapted to wedge-fit through said hasp member and against said base plate.

11. A solid waste chipper comprising:
 a. at least one elongated chipper blade having opposite end portions,
 b. means for moving said chipper blade in a rotary path about a rotary axis,
 c. said moving means comprising at least a pair of disc members concentric with said rotary axis and spaced apart sufficiently to receive one end portion of said chipper blade,
 d. axially aligned pin holes of gradually decreasing diameter formed sequentially through said discs and said one end portion of said chipper blade,
 e. a pin having sections corresponding diametrically to said holes and adapted to be received snugly through said holes,
 f. said pin having a head on the end of the large diameter section,
 g. means for retaining the small diameter section of said pin in said corresponding hole, and
 h. said pin pivotally connecting said one end portion said chipper blade to said pair of disc members to permit free swinging movement of said opposite end portion.

12. The invention according to claim 11 in which said retaining means comprises a slightly enlarged chamfered portion on the end of said small diameter section, said enlarged chamfered portion being split diametrically to form spaced elastic legs adapted to be squeezed together as said pin is forced through said aligned holes and adapted to expand to a retaining position after said pin is received through said holes.

13. The invention according to claim 11 further comprising a plurality of pairs of said disc members, at least one of said chipper blades being received between each pair of said disc members, each of said pairs of said disc members and corresponding blades having said pins and pin holes axially aligned, said small diameter sections pointing in the same axial direction, so that a single elongated rod forced sequentially against the small diameter end portion of each pin will sequentially remove each pin from its corresponding pin holes.

14. A solid waste chipper comprising:
 a. a housing having an inlet through which solid waste objects may be introduced for chipping, and an outlet through which chipped solid waste particles may exit,
 b. at least one elongated chipper blade having opposite end portions,
 c. means mounting said chipper blade for movement in a rotary path within said housing about a rotary axis,
 d. means for rotating said chipper blade in said rotary path,
 e. at least one pair of anvil bars,
 f. each of said anvil bars being of uniform size and substantially triangular, including a leading edge, a trailing edge and a base edge portion,
 g. a base plate fixed to the base edge portions of said anvil bars so that said anvil bars form a circumferential slot through which said chipper blade is adapted to move,
 h. said base plate having an arcuate cross-section and opposite end portions,
 i. arcuate support members fixed in said housing and spaced apart longitudinally a distance slightly less than the length of said base plate, so that said opposite end portions engage flush against said arcuate support members,
 j. means detachably securing the opposite end portions of said base plate to said spaced arcuate support members, so that said anvil bars are spaced apart on opposite sides of said rotary path, and said leading edge slopes from the rotary axis of said shaft, so that said chipper blade moves through said slot from said leading edges toward said trailing edges to normally engage a solid waste object on said leading edges at an acute shearing angle, and
k. said slot communicating with said outlet.

15. The invention according to claim 14 in which said detachable securing means comprise one or more apertures in each end portion, a hasp member fixed to each of said support members and adapted to extend through a corresponding aperture, and a key member adapted to wedge-fit through said hasp member and against said base plate.

* * * * *